US008601010B1

(12) United States Patent
Felton et al.

(10) Patent No.: US 8,601,010 B1
(45) Date of Patent: Dec. 3, 2013

(54) APPLICATION MANAGEMENT DATABASE WITH PERSONNEL ASSIGNMENT AND AUTOMATED CONFIGURATION

(75) Inventors: John D. Felton, Leawood, KS (US); Scott D. Perrea, Overland Park, KS (US); Michael J. Taylor, Liberty, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2198 days.

(21) Appl. No.: 11/195,543

(22) Filed: Aug. 2, 2005

(51) Int. Cl.
*G06F 17/30* (2006.01)
*G06F 7/00* (2006.01)

(52) U.S. Cl.
USPC .......................................... 707/758; 707/804

(58) Field of Classification Search
USPC .................. 707/104.1, 10, 100, 758, 804; 715/700–866
See application file for complete search history.

(56) References Cited

U.S. PATENT DOCUMENTS

| | | | |
|---|---|---|---|
| 5,721,913 A * | 2/1998 | Ackroff et al. | 707/103 R |
| 6,640,244 B1 | 10/2003 | Bowman-Amuah | |
| 6,671,818 B1 | 12/2003 | Mikurak | |
| 7,100,195 B1 | 8/2006 | Underwood | |
| 7,664,756 B1 | 2/2010 | Felton et al. | |
| 7,668,947 B2 * | 2/2010 | Hutchinson et al. | 709/223 |
| 2003/0055749 A1 | 3/2003 | Carmody et al. | |
| 2003/0212643 A1 | 11/2003 | Steele et al. | |
| 2004/0001099 A1 * | 1/2004 | Reynar et al. | 345/776 |
| 2004/0024644 A1 * | 2/2004 | Gui et al. | 705/22 |
| 2004/0024658 A1 * | 2/2004 | Carbone et al. | 705/28 |
| 2004/0024660 A1 * | 2/2004 | Ganesh et al. | 705/28 |
| 2005/0138074 A1 * | 6/2005 | O'Connor et al. | 707/104.1 |
| 2005/0256881 A1 * | 11/2005 | Harrison et al. | 707/10 |
| 2006/0059253 A1 | 3/2006 | Goodman et al. | |
| 2006/0123022 A1 * | 6/2006 | Bird | 707/100 |
| 2006/0178954 A1 * | 8/2006 | Thukral et al. | 705/28 |

OTHER PUBLICATIONS

Hemmat, Merzad, "Defining and Sizing Feasible Approaches to Business Needs Within an Integrated Development Process," Filing Date—May 5, 2003, U.S. Appl. No. 10/429,615.
Hemmat, Merzad, "Method for Discovering Functional and System Requirements in an Integrated Development Process," Filing Date Aug. 18, 2003, U.S. Appl. No. 10/643,334.
Felton, John D., et al., "Configuration Management Database Implementation with End-to-End Cross-Checking System and Method," Filing Date—Oct. 7, 2005, U.S. Appl. No. 11/245,593.
Office Action dated Dec. 19, 2007 (19 pages), U.S. Appl. No. 11/245,593, filed Oct. 7, 2005.
Final Office Action dated Jun. 20, 2008 (21 pages), U.S. Appl. No. 11/245,593, filed Oct. 7, 2005.
Advisory Action dated Sep. 8, 2008 (3 pages), U.S. Appl. No. 11/245,593, filed Oct. 7, 2005.
Office Action dated Oct. 29, 2008 (18 pages), U.S. Appl. No. 11/245,593, filed Oct. 7, 2005.
Final Office Action dated Apr. 27, 2009 (25 pages), U.S. Appl. No. 11/245,593, filed Oct. 7, 2005.

(Continued)

*Primary Examiner* — Jacob F Bétit
*Assistant Examiner* — Bao Tran

(57) ABSTRACT

A computer implemented asset management system is disclosed. The computer implemented asset management system comprises an asset data store containing information about assets that is updated at intervals. The computer implemented asset management system also comprises a personnel data store containing information about individuals and an analysis component operable to identify an association of individuals with each of the assets.

13 Claims, 3 Drawing Sheets

(56) References Cited

OTHER PUBLICATIONS

Advisory Action dated Jul. 7, 2009 (4 pages), U.S. Appl. No. 11/245,593, filed Oct. 7, 2005.

Notice of Allowance and Fee(s) Due; Examiner's Amendment dated Sep. 30, 2009, 29 pages, U.S. Appl. No. 11/245,593, filed Oct. 7, 2005.

Advisory Action dated Jun. 22, 2010 (3 pages), U.S. Appl. No. 11/288,705, filed Nov. 29, 2005.

* cited by examiner

APPLICATION MANAGEMENT DATABASE WITH PERSONNEL ASSIGNMENT AND AUTOMATED CONFIGURATION

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to information technology, and more particularly, but not by way of limitation, to a system and method for monitoring and managing computer system assets.

BACKGROUND OF THE INVENTION

Business operations have become dependent upon computer systems. Medium sized businesses may operate hundreds of computers connected together by various networking components. Large businesses may operate tens of thousands of computers. Computer system assets may include computers, software applications, network components, and peripherals. These computer system assets may be purchased from different vendors or original equipment manufacturers at different times and may be located within different regional offices within the enterprise.

SUMMARY OF THE INVENTION

A computer implemented asset management system is disclosed. The computer implemented asset management system comprises an asset data store containing information about assets that is updated at intervals. The computer implemented asset management system also comprises a personnel data store containing information about individuals and an analysis component operable to identify an association of individuals with each of the assets.

A computer implemented method of managing an inventory of assets is also disclosed. The computer implemented method comprises periodically identifying assets, associating individuals with assets, validating that the individuals are properly associated with the assets and generating an exception report about an individual that is improperly associated with an asset.

A computerized inventory system is also disclosed. The computerized inventory system comprises a catalog of inventory items produced periodically by computer applications operable to survey assets of an enterprise, a list of active employees and contractors of the enterprise, and an inventory application operable to determine that one of the inventory items is associated appropriately with one of the employees based on the survey and the list. The inventory application is further operable to generate an exception report for inventory items that are inappropriately associated with one of the employees.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Maintaining a current inventory of computer system assets linked with individuals who are responsible for the assets, either as the principal user of the asset or as the system administrator responsible for maintaining the asset, is a challenging task. Often, association of assets to individuals is a manual process that may not be updated as individuals leave the enterprise or are reassigned within the enterprise. Keeping track of how many computer systems an application is installed on, for example a commercial-off-the-shelf-software (COTS) package, is difficult, yet an enterprise that is demonstrated to be running more instances of a COTS package than it has licenses for may be required to pay punitive compensation to the COTS developer. The present disclosure provides an automated computer asset inventory application that periodically conducts an automated survey of all computer system assets and validates associations of individuals to the assets. A system that provides this functionality is described hereinafter.

Figure 1:
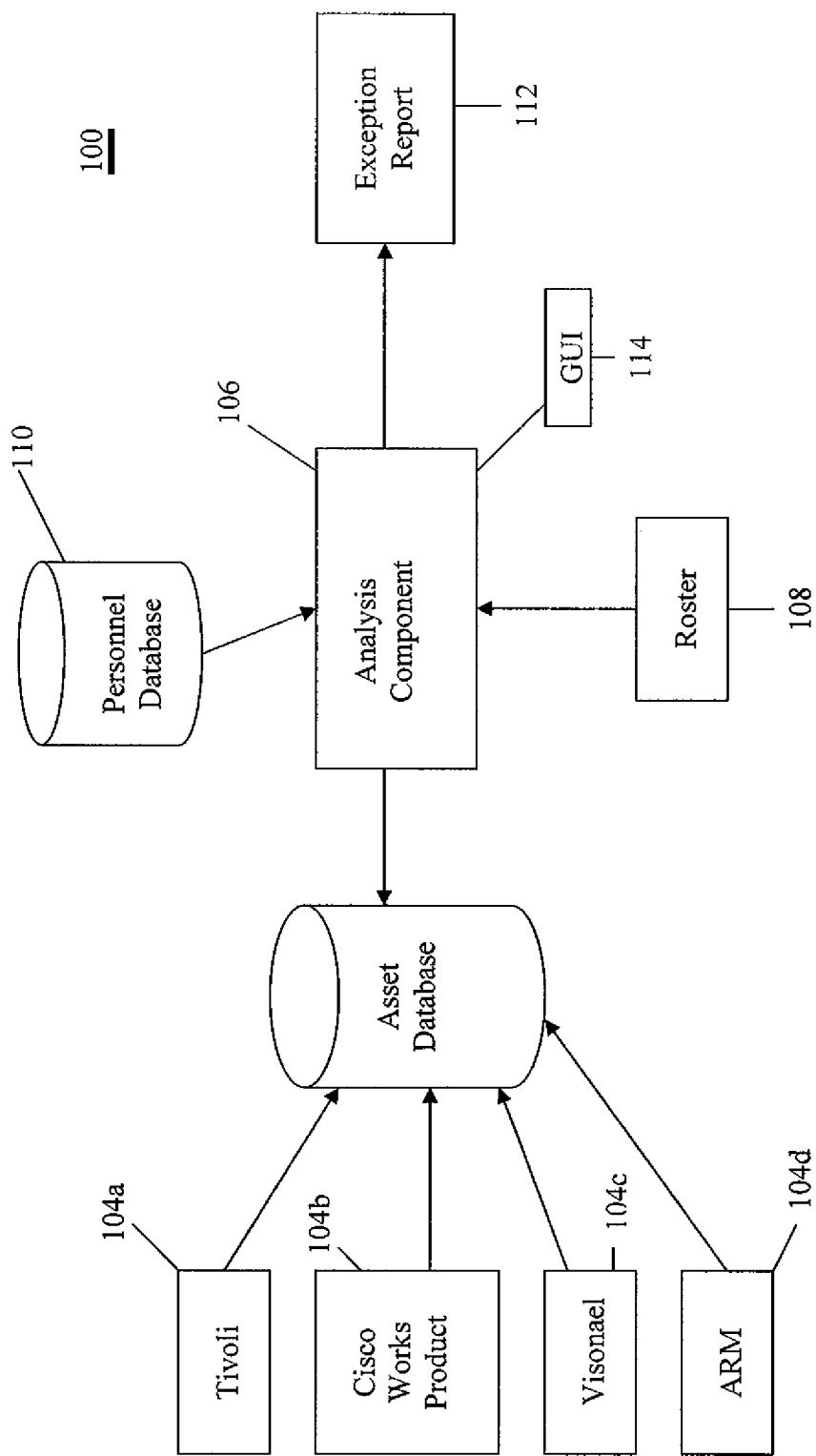
FIG. 1 is a block diagram of a system for providing automatic inventorying of assets and associating individuals to those assets according to an embodiment of the present disclosure.

Turning now to FIG. 1, a system 100 for maintaining an inventory of a plurality of computer system assets and associations of individuals to the assets is depicted. An asset data store 102 contains various information about the assets. The asset data store 102 is updated periodically to keep the information up-to-date. In an embodiment, the asset data store 102 is updated daily, but in other embodiments the asset data store 102 may be updated on a different periodic basis. In an embodiment, the asset data store 102 may be updated on nights before regular business days, but not updated before a weekend day or before a holiday.

The updated asset information is provided by one or more automated tools 104 that are operable to survey the assets and write reports on the assets into the asset data store 102. The assets may include applications, commercial-off-the-shelf-software packages, operating systems, server computers, desktop computers, laptop computers, main frame computers, modems, hubs, routers, wireless access points, gateways, switches, firewalls, circuit boards, printers, database management systems, disk drives, tape drives, facsimile machines, scanners, point-of-sale devices, and other assets.

In an embodiment, an automated Tivoli tool 104a surveys server computers and reports on the assets to the asset data store 102. A Tivoli agent or software component may be installed on each of the several server computers in an enterprise and configured to survey the server computer it is installed on, reporting back to the Tivoli tool 104a. A script may be installed on the server assets to survey the circuit cards, operating system version, and application versions installed on the assets.

The script may search for specific files on the asset and based on the presence of a first file, for example a specific executable, may then search for other files, determining a specific version of an executable based on the presence of a specific mix of files. The specific mix of files may be referred to as a fingerprint of the application version. To identify that a specific application version is present, a certain file or group of files, the fingerprint, must be present. This technique may be more effective than relying on the presence or absence of a single executable. It has been found that some versions of software may employ the same executable file from an earlier version to a later version, the executable files even retaining the same file dates. Differences among versions may only be distinguished, in some cases, by looking at the presence of other files. In practice, the mix of files that constitute the fingerprint of a specific version may be determined by comparing directory contents between versions. The information reported may include identification of the computer model, the operating system version installed on the server computer, and details about the circuit board configuration of the server computer.

In an embodiment, a Cisco works product automated tool 104b surveys some network hardware, for example routers, bridges, and switches, and reports on the assets to the asset data store 102. In an embodiment, a Visonael automated tool 104c surveys network hardware, for example routers, bridges, and switches, and reports on the assets to the asset data store 102. The asset information collected about network assets may include information, for example routing tables, that enables determination of relationships, dependencies, and information flow among network assets.

In an embodiment, an asset management repository automated tool 104d surveys desktop computers and reports on the assets to the asset data store 102. The asset management repository automated tool 104d may also survey laptop computers and report on the laptop assets to the asset data store 102. A script may be installed on the desktop and laptop assets to survey the circuit cards, operating system version, and application versions installed on the assets. The script may employ the identification technique based on the application fingerprint described above. The asset management repository automated tool 104d may perform trend analysis of login sessions to associate a specific user with a desktop, for example based on the user logging into the desktop three times in a row. The employment of login trend analysis may prevent a one-time user from being incorrectly associated with a system. In an embodiment, trend analysis of logins may be used on other assets, also, to associate an individual with the assets. In an embodiment, trend analysis of logins may be performed by an agent or a software component that executes on the subject asset, for example a desktop computer or a laptop computer, and communicates back to the asset management repository automated tool 104d.

An analysis component 106 conditions the information that the automated tools 104 write to the asset data store 102 to enforce consistent naming of assets and formatting of information. The analysis component 106 is also operable to associate one or more individuals, for example employees of the enterprise or contractors, with the assets. The individuals that are associated with and have some interest in the subject asset or some work role tied to the subject asset may also be referred to as stakeholders. The work role may be referred to as the stakeholder role. For example, several different individuals may be associated with a server computer in different stakeholder roles including a system administrator role, a system administrator supervisor role, a cost center manager role, a functional manager role, and other roles. The analysis component 106 may use a roster 108 that defines stakeholder roles and individuals filling those roles for several of the assets. The roster 108 may also be referred to as a list of employees and contractors.

The analysis component 106 periodically validates, wherein the period is related to the period of the update of the asset data store 102, the association of individuals to assets by determining that each of the individuals remains employed or otherwise associated with the enterprise and that the individual is a member of a work group that is appropriate to the stakeholder role that the individual fills with respect to the subject asset. The analysis component 106 may access a personnel data store 110, for example, to determine the status of the individuals and their work group. The data store 110 may be maintained by a human resources department and contain employment status, work group assignment, and other information on individuals. The human resources department may maintain the currency of the data store 110 so that when an employee is terminated, the employee's employment status is promptly updated in the data store 110. Additionally, the human resources department may maintain the currency of the data store 110 when an employee is transferred among different work groups. Validation of the association of individuals with assets may be referred to as checks and balances and also as determining that individuals are properly associated with the assets. In an embodiment, the analysis component 106 may be referred to as a consolidated operational database interface (CODI).

When the analysis component 106 fails in an attempt to validate the association between an individual and an asset with which the individual is associated, for example when the individual has been terminated, the analysis component 106 generates an exception record that is entered in an exception report 112. The exception record describes the validation attempt and the reason validation failed. As the analysis component 106 proceeds through the validation activity, exception records are accumulated into the exception report 112. In an embodiment, stakeholders associated with an asset who are successfully validated may be contacted with the exception record when the asset fails validation, for example via an email or through an automated page.

In an embodiment, the analysis component 106 may be operable to determine that an asset is absent and to generate an exception report about this absence. The analysis component 106 may determine an asset is absent by scanning the roster 108 which associates individuals to assets or by comparing the update asset information in the asset data store 102 to an earlier version of the asset information, for example from the prior update.

The analysis component 106 may be operable to mine the asset data store 102 in various ways to extract desired information. For example, a router may be specified by using a graphical user interface (GUI) 114 to input a name of the router. Then downstream affected network assets, desktop assets, laptop assets, and server assets may be identified based on the specified router, for example by examining a routing table maintained by the router that identifies these assets. This information may be useful in notifying systems that would be affected by a maintenance outage planned for the router.

Figure 2:
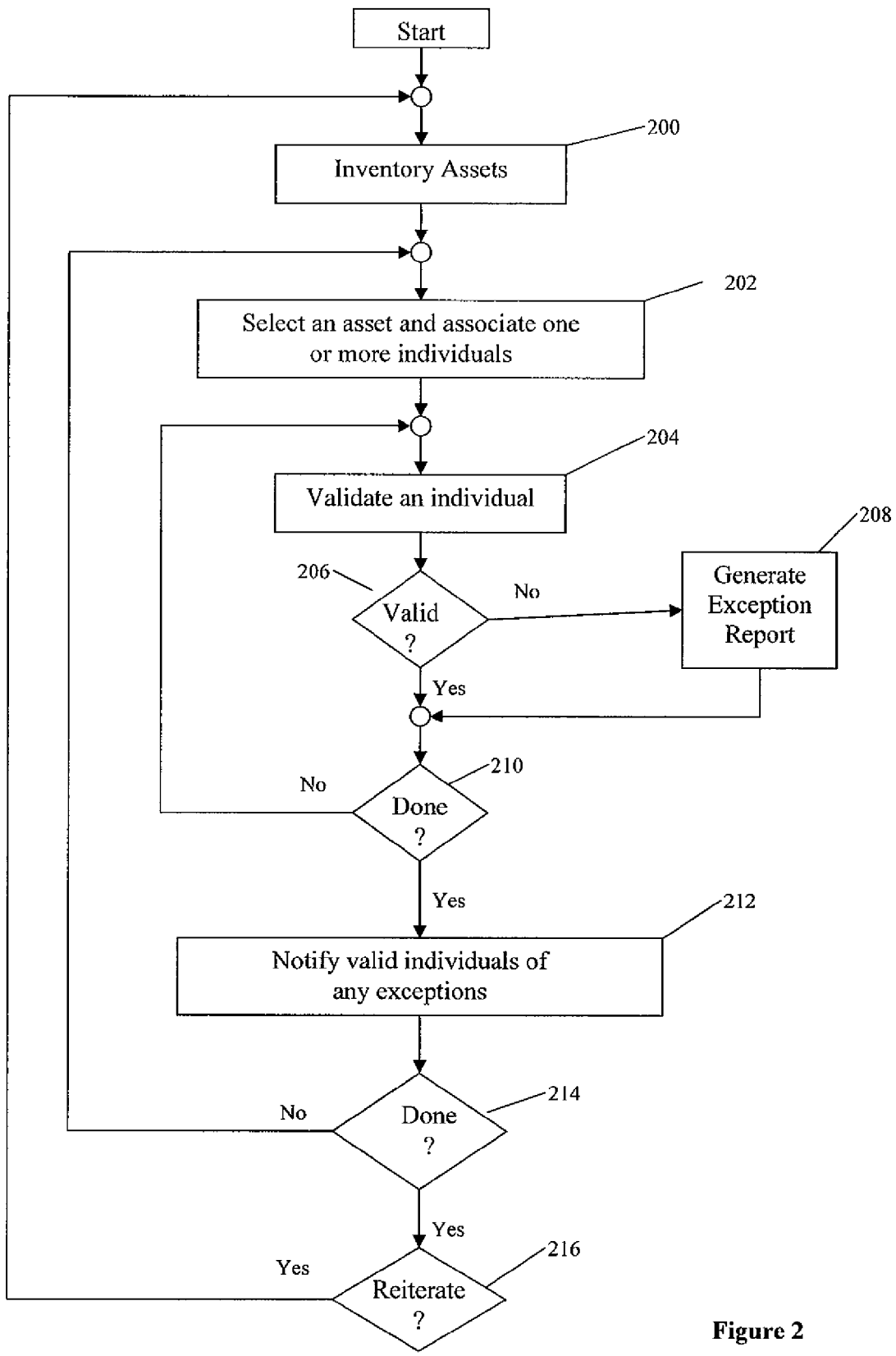
FIG. 2 is a flow diagram of a method for providing automatic inventorying of assets and associating individuals to those assets according to another embodiment of the present disclosure.

Turning now to FIG. 2, a flow diagram of a method of managing an inventory of assets is depicted. The method begins in block 200 where the assets of the enterprise are inventoried. The assets may include applications (which may also be referred to as computer programs or software), commercial-off-the-shelf-software packages, operating systems, server computers, desktop computers, laptop computers, main frame computers, modems, hubs, routers, wireless access points, gateways, switches, firewalls, circuit boards, printers, database management systems, disk drives, tape drives, facsimile machines, scanners, point-of-sale devices, and other hardware, software, peripheral, and/or network assets. Inventorying the assets may include collecting version and/or model information.

The method proceeds to block 202 where one asset is selected and one or more individuals are associated with the subject asset. The individuals have some interest in the subject asset or some work role tied to the subject asset and may also be referred to as stakeholders. The individuals may be associated with the subject asset on the basis of a list or a roster that defines associations of individuals to assets or the association may be based on a trend analysis of logins. For example, an individual who logged in the three most recent times to a desktop computer may be deemed the primary user of the desktop computer on the basis of trend analysis.

The method proceeds to block 204 where one of the individuals associated with the subject asset is validated. This action may involve confirming that the subject individual is a current employee or contractor and/or that the subject individual is currently a member of a group that is authorized to be associated with the subject asset. This may be accomplished by communicating with the personnel data store 110 or some human resources data store or file system. The method proceeds to block 206 where if the subject individual is deemed invalid the method proceeds to block 208 where an exception record describing the failure to validate the association of the subject individual to the asset is generated and stored in an exception report.

The method proceeds to block 210 where if other individuals associated with the subject asset have not been validated the method returns to block 204 otherwise the method proceeds to block 212. In block 212 individuals whose association with the subject asset were validated are notified of any exception records generated against the subject asset.

The method proceeds to block 214 where if all associations of individuals with assets has not been completed, the method returns to block 202 otherwise the method proceeds to block 216. In block 216, when appropriate the method returns to block 200 to re-inventory the assets. In an embodiment, the re-inventory may occur every day, perhaps starting immediately after midnight during what may be a low volume processing time for the enterprise. In other embodiments, other periodic intervals and other start-times may be employed.

In other embodiments, other sequences of these blocks may be employed. For example, while the exemplary method described above validated an individual and generated an exception report before proceeding to validate another individual associated with the subject asset, in another embodiment each of the individuals associated with the subject asset may each be validated in turn and then after all individuals associated with the subject asset any appropriate exception records are generated. These and other re-orderings of the processing or the blocks described in the exemplary method readily occur to one skilled in the art and are all contemplated by the present disclosure.

Figure 3:
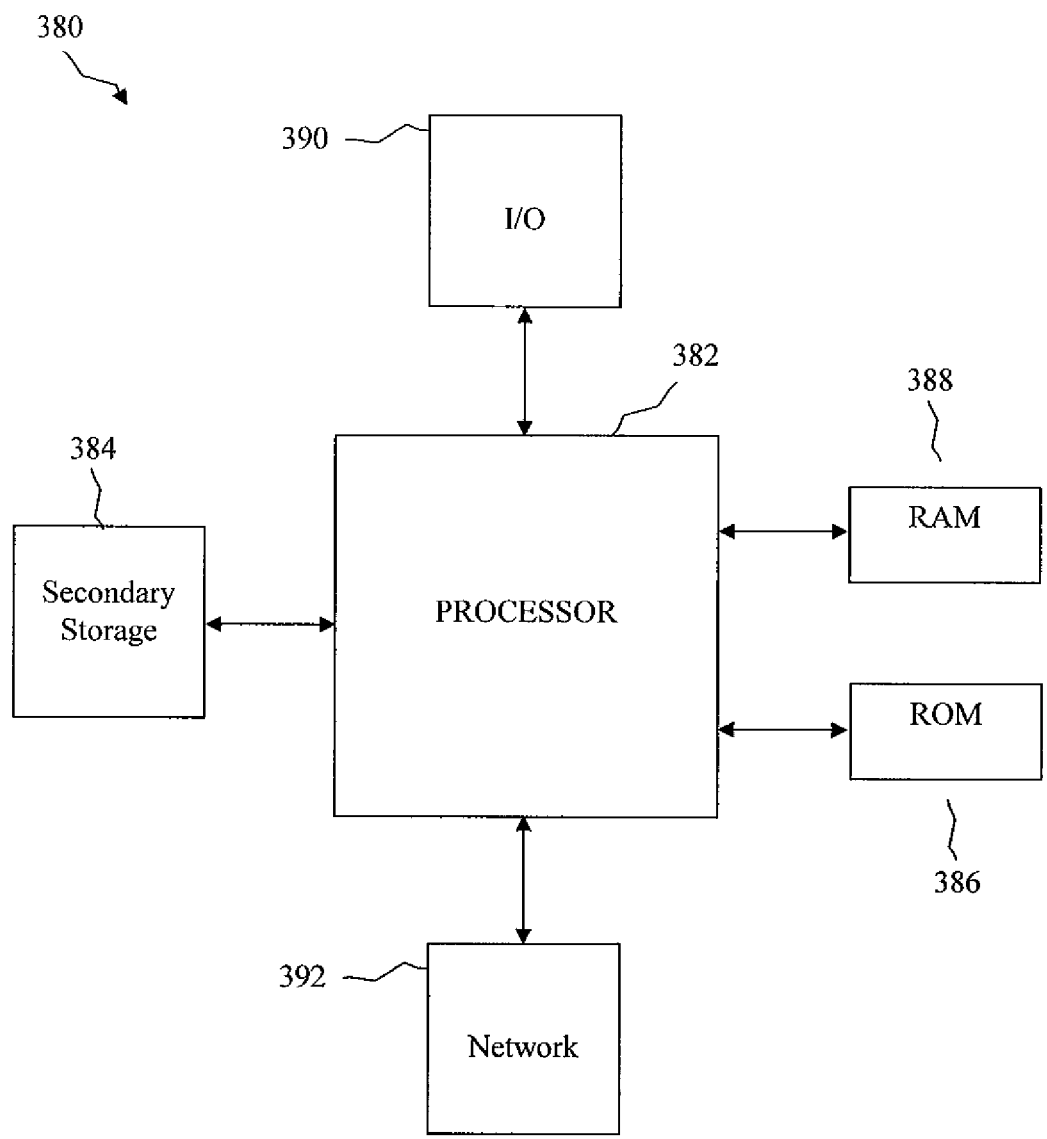
FIG. 3 illustrates an exemplary general purpose computer system suitable for implementing the several embodiments of the disclosure.

The system 100 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented asset management system, comprising:
    a processor;
    a memory;
    an asset data store containing information about each of a plurality of assets, the information updated periodically;
    a personnel data store containing information about a plurality of individuals; and
    an analysis component stored on the memory, the analysis component executable by the processor to determine a validity of an association of one or more individuals with one of the plurality assets; and
    the analysis component executable by the processor to generate an exception report when the association of one or more individuals with one of the plurality of assets is invalid, wherein the exception report includes an exception record that describes the determination of the validity of the association and a reason the determination of the validity of the association failed.

2. The computer implemented asset management system of claim 1, wherein the assets are selected from the group consisting of applications, commercial-off-the-shelf-software packages, operating systems, server computers, desktop computers, laptop computers, main frame computers, modems, hubs, routers, wireless access points, gateways, switches, firewalls, circuit boards, printers, database management systems, disk drives, tape drives, facsimile machines, scanners, and point-of-sale devices.

3. The computer implemented asset management system of claim 1, wherein the information about the individuals includes a group associated with the individual and wherein the validity of the association of the one or more of the individuals with the one of the assets is at least partially based on the group the individual belongs to.

4. The computer implemented asset management system of claim 1, wherein the analysis component generates the exception report when the asset is associated with an individual whose information is denoted as terminated in the personnel data store.

5. The computer implemented asset management system of claim 1, further including a roster associating one or more of the individuals with some of the assets, wherein the analysis component associates individuals with some of the assets based on the roster.

6. The computer implemented asset management system of claim 1, further including an agent that executes on some of the assets, the agent operable to associate one of the individuals with the asset based on trend analysis of a plurality of login sessions on the asset, the agent further configured to communicate the association of the individual with the asset to the analysis component, and wherein the analysis component is further configured to associate the individual with the asset based on the communication from the agent.

7. A computer implemented method of managing an inventory of assets, comprising:
    periodically identifying a plurality of assets;
    associating one or more individuals with one of the plurality of assets;
    validating by an analysis component stored on computer readable storage medium and executing on a processor whether the one or more individuals are properly associated with one of the plurality of assets; and
    generating by the analysis component an exception report for improper association of the one or more individuals with one of the plurality of assets, wherein the exception report includes an exception record that describes the validating of whether the one or more individuals are properly associated with one of the plurality of assets and a reason for the improper association.

8. The computer implemented method of claim 7, wherein the assets are identified daily.

9. The computer implemented method of claim 7, further including:
    comparing assets identified in a first period to assets identified in a second period; and
    generating the exception report when the assets identified in the first period and in the second period do not match.

10. The computer implemented method of claim 7, wherein validating whether the one or more individuals are properly associated with one of the plurality of assets includes confirming that the one or more individuals are one of an employee and an approved contractor and further includes confirming that the individual is a member of a group authorized to exercise an assigned role associated with the asset.

11. The computer implemented method of claim 7, wherein the exception report is automatically communicated to each of the individuals who are properly associated with the asset.

12. The computer implemented method of claim 7, further including defining a roster of individuals and their association to at least some of the assets, wherein the associating one or more individuals with one of the plurality of assets is based at least partly on the roster.

13. The computer implemented method of claim 12, wherein the roster identifies system administrators that are associated with some of the assets and further identifies supervisors of the system administrators and wherein the exception report is communicated to the system administrators associated with the asset and to the supervisors of the system administrators associated with the asset.

* * * * *